(12) United States Patent
Pecen et al.

(10) Patent No.: US 6,424,637 B1
(45) Date of Patent: Jul. 23, 2002

(54) METHOD FOR SYNCHRONIZING A MOBILE STATION TO UMTS WHILE OPERATING IN GSM DEDICATED MODE

(75) Inventors: Mark Edward Pecen, Rolling Meadows, IL (US); Niels Peter Skov Andersen, Roskilde (DK); Christopher Parker, Swinden (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/599,492

(22) Filed: Jun. 23, 2000

(51) Int. Cl.[7] .............................. H04Q 7/00; H04J 3/06
(52) U.S. Cl. ................. 370/328; 370/510; 370/332; 704/246
(58) Field of Search .................. 370/328–332, 370/321, 337, 465, 466, 468, 469, 503, 520, 512, 509, 350, 510; 455/436, 403, 422, 439, 450; 375/145, 140, 137, 133, 129, 355, 368, 346; 704/246, 210

(56) References Cited

U.S. PATENT DOCUMENTS

| | | | | | |
|---|---|---|---|---|---|
| 5,239,557 A | * | 8/1993 | Dent | .............................. | 375/1 |
| 5,835,889 A | * | 11/1998 | Kapanen | ..................... | 704/215 |
| 6,097,772 A | * | 8/2000 | Johnson et al. | ............. | 375/346 |
| 6,119,015 A | * | 9/2000 | Eun | ........................... | 455/502 |
| 6,181,683 B1 | * | 1/2001 | Chevillat et al. | ........... | 370/329 |

OTHER PUBLICATIONS

Draft ETSI EN 300 911 V6.5.0 (Jul. 1999) Title: Digital Cellular Telecommunications System (Phase 2+); Radio Subsystem Link Control (GSM 05.08 Version 6.5.0 Release 1997).

Draft EN 300 908 V6.5.0 (Jul. 1997) Digital Cellular Telecommunications System (Phase 2+); Multiplexing and Multiple Access On The Radio Path (GSM 05.02 Version 6.5.0 Release 1997).

* cited by examiner

Primary Examiner—Alpus H. Hsu
Assistant Examiner—Duc Ho
(74) Attorney, Agent, or Firm—Michael C. Soldner; Matthew C. Loppnow

(57) ABSTRACT

A method for universal mobile telephone service synchronization by a mobile station operating in a GSM dedicated mode in a wireless communication system including a mobile station sending voice signals to and receiving voice signals from a base station. A voice activity detector transmits control information indicating detection of voice activity at the mobile station, and an equalizer identifies and processes a training sequence and transmitting corresponding information for the training sequence. A physical layer interface determines whether the mobile station is utilizing discontinuous transmission mode, based on the control information from the voice activity detector, and determines whether the based station is utilizing discontinuous transmission mode, based on the correlation information from the equalizer, and universal mobile telephone service synchronization is performed in response to the mobile station and the base station utilizing discontinuous transmission mode.

24 Claims, 3 Drawing Sheets

METHOD FOR SYNCHRONIZING A MOBILE STATION TO UMTS WHILE OPERATING IN GSM DEDICATED MODE

FIELD OF THE INVENTION

The present invention relates generally to third generation wireless communications, and in particular, the present invention relates to synchronization of a mobile station during handover between a third generation communication system and the Global System for Mobile Communications system.

BACKGROUND OF THE INVENTION

Problems associated with the interoperability of third generation universal mobile telephone service (UMTS) with existing services, such as the Global System for Mobile Communications (GSM), have been identified. In particular, one of the primary concerns in the standardization of third generation services, such as UMTS, is the definition of methods which permit inter-service cell reselection and handover from GSM to UMTS, and visa-verse.

During the initial deployment, it is important that UMTS systems interoperate with existing GSM systems, since, for a given effective radiated power level, a GSM transmission at 900 MHz exhibits a much better ability to penetrate most modern building materials, when compared to a UMTS transmission at 2100 MHz. As a result, during the first stages of UMTS deployment in an existing GSM environment, multiple handovers between GSM and UMTS will be likely, as mobile users move deep inside buildings where GSM at 900 MHz would likely provide a more reliable path than UMTS at 2100 MHz. A clearly specified set of inter-working functions to address these type of operational issues will therefore be necessary, at least during initial deployment of third generation UMTS while microcells are being deployed to fill in coverage gaps in the new UMTS environment.

In order to prepare for a handover from GSM to UMTS, the mobile station must acquire synchronization on the UMTS target cell prior to the handover while simultaneously involved in dedicated traffic flow on a GSM traffic channel (TCH). However, operations associated with acquiring synchronization to a UMTS cell are unacceptably long and will exceed the amount of time normally available (i.e. schedulable) during a GSM circuit-switched voice call, causing the handover to be problematic.

For example, in order to acquire synchronization on UMTS, a typical period of 10 to 12 free GSM idle frames would be required under ideal conditions. Assuming that all idle frames are free, then the actual period required would be 1.44 seconds. In reality, the time required for synchronization to UMTS is heavily influenced by the variable quantity expressed as the ratio of the energy per chip to base channel interference level (E c /I O), and may range from 1.44 seconds, under ideal E c /I O conditions, to between 5 and 16 seconds, in the case of fast-moving mobile stations and poor E c /I O. This dependency is further complicated by the fact that a GSM idle frame must actually be free, and therefore available for use by the UMTS synchronization procedure. The actual time required in a real GSM/UMTS operational environment is likely to be greater than the estimates of minimum 1.44 seconds to a maximum of 16 seconds.

In addition, a significant portion of the synchronization period may be accounted for by the assumed method's dependency on idle frames, i.e., that the actual idle periods of time in which synchronization activities may be performed are relatively short (4.6 ms), and that idle periods themselves are relatively infrequent, having a periodicity of 120 ms.

Accordingly, what is needed is a method for synchronizing a mobile station during handovers between GSM and UMTS services.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention is a procedure for universal mobile telephone service system synchronization, in which synchronization is performed by a mobile station in GSM dedicated mode during available idle frames, during periods of voice data inactivity on the downlink when the base station is utilizing a discontinuous transmission mode, and during periods of voice inactivity on the uplink when the mobile station is utilizing discontinuous transmission mode.

Figure 1:
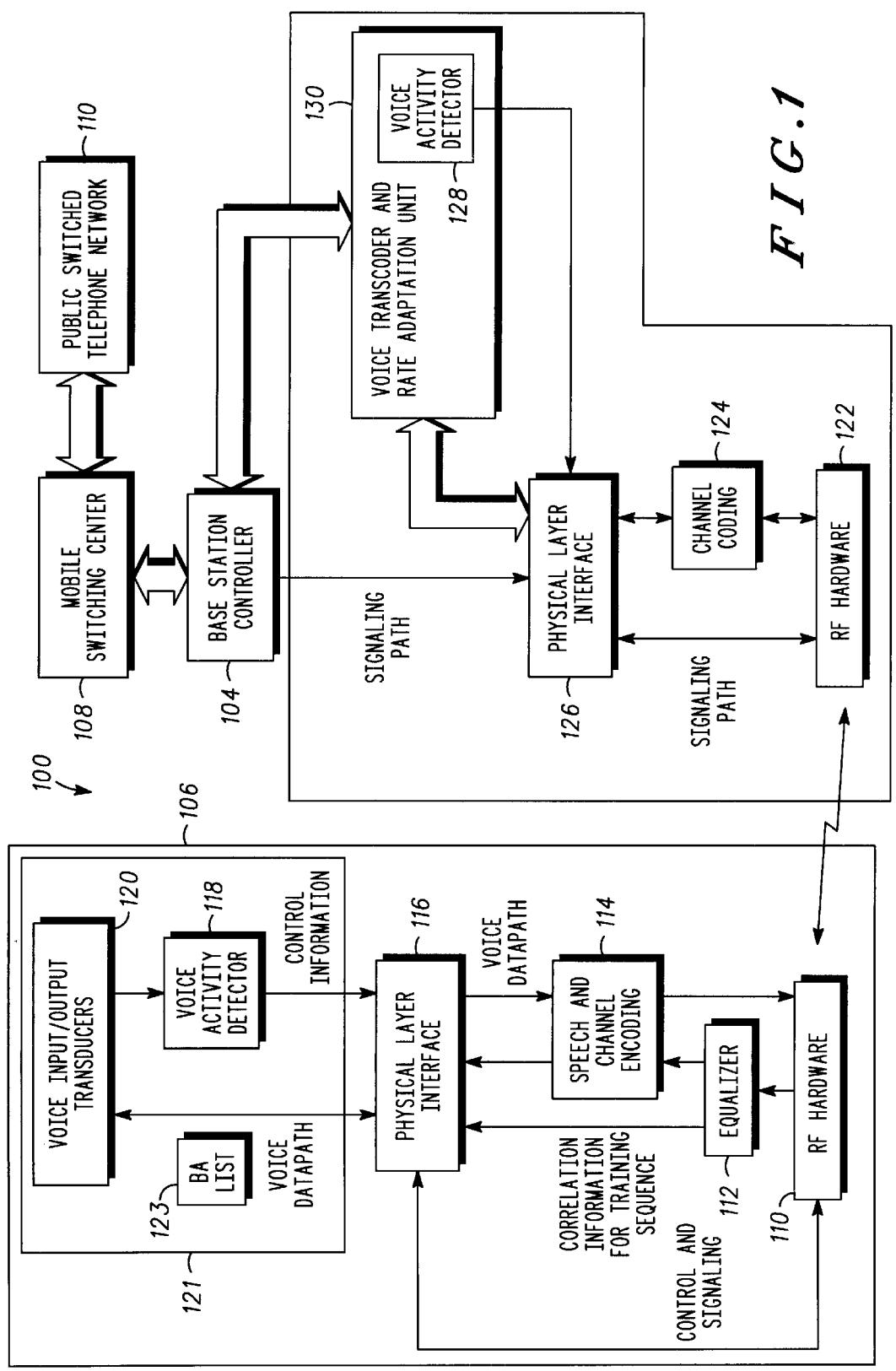
FIG. 1 is a schematic diagram of a wireless communication system according to the present invention.

FIG. 1 is a schematic diagram of a wireless communication system according to the present invention. As illustrated in FIG. 1, a wireless communication system 100 includes a base station 102, coupled to a base station controller 104, a mobile switching center 108 coupled to base station controller 104 and to a public switched telephone network 110, and a mobile station 106, such as a wireless telephone device. Mobile station 106 includes RF hardware 110 for transmitting signals to and receiving signals from base station 102 along air interface 111, an equalizer unit 112, a speech and channel coding unit 114, a physical interface layer 116, and a voice activity detector 118, voice input/output transducers 120 and a broadcast control channel (BCCH) allocation list ("BA list") 123 included in a call processor 121. It is understood that while call processor 121 includes elements in addition to voice activity detector 118, voice input/output transducers 120 and BA list 123, these additional elements have not been included in the description of FIG. 1 merely for purposes of simplification.

Base station 102 includes RF hardware 122, a channel coding unit 124, a physical interface layer 126, and a voice activity detector 128 positioned within a voice transcoder and rate adaptation unit 130. It is understood that although a single mobile station 106, base station 102, and base station controller 104 are shown in FIG. 1, more than one mobile station, base station and base station controller are located within wireless communication system 100.

Once mobile switching center 108 is informed by public switched telephone network 110 of the existence of a call intended for mobile station 106, the call is transmitted by mobile switching center 108 to base station controller 104.

Base station controller 104 sends signaling data to physical interface layer 126, and sends voice data to voice transcoder and rate adaptation unit 130. Voice transcoder and rate adaptation unit 130 adapts the signal rate from the wireline domain of mobile switching center 108 and public switched telephone network 110 to the signal rate required by RF hardware 122. Voice activity detector 128 detects the presence of signals that are transmitted by voice transcoder and rate adaptation unit 130 to physical interface layer interface 126, and sends corresponding control information indicating the detection of voice activity to physical interface layer 126. The signaling data sent from base station controller 104 is transmitted by physical layer interface 126 to RF hardware 122, while the voice data from voice transcoder and rate adaptation unit 103 is transmitted from physical layer interface 126 to channel coding unit 124. Channel coding unit 124 adds block coding to the voice data, along with convolutional encoding, that adds redundancy to enable error correction at RF hardware 122. Channel coding unit 124 sends the resulting coded voice data to RF hardware 122. Both the signaling data from physical layer interface 126 and the coded voice data from channel coding unit 124 are transmitted by RF hardware 122 to mobile station 106 along air interface 111.

Once the signaling data and coded voice data is received by RF hardware 110 of mobile station 106, RF hardware 110 sends control and signaling information to physical layer interface 116 and coded voice data to equalizer 112. Equalizer 112 receives the information, identifies and processes a training sequence to reduce the effects of multi-path and delay spreading, and transmits correlation information for the training sequence to the physical layer interface 116. According to the present invention, physical layer interface 116 uses the correlation information for the training sequence provided by equalizer 112 to determine whether base station 102 is entering DTX on the downlink, as described below. In addition, voice related information is transmitted from equalizer 110 to speech and coding unit 114, which then sends corresponding voice data to physical interface layer 116. Physical layer interface 116 provides interface between RF hardware 110 and call processor 121, including scheduling of reception and transmission of physical data, receiver gain control, transmitter power control, signal level measurements, and so forth. As a result, physical layer 116 transmits voice data corresponding to the received information from RF hardware 110 to voice input/output transducers 120, which then outputs an audible signal to be heard by a user of mobile station 106.

A voice signal to be transmitted from mobile station 106 to base station 102 is converted to voice data by voice input/output transducers 120 and transmitted to physical layer interface 116. Voice activity detector 118 detects the presence of signals that are transmitted or received by voice input/output transducers 120, and sends corresponding control information indicating detection of voice activity to physical interface layer 116. Physical interface layer 116 transmits control and signaling information to RF hardware 110, and voice data is transmitted to speech and channel coding unit 114, which adds redundancy and sends corresponding redundant voice data to RF hardware 110. RF hardware 110 transmits the resulting signaling and control data, in addition to the redundant voice data to base station 102 along air interface 111.

Once the voice and the signaling and control data is received by RF hardware 122, RF hardware transmits the signaling and control data to physical interface layer 126, and the voice data is transmitted to channel coding unit 124. Channel coding unit 124 removes the redundancy and sends resulting voice data to the physical interface layer 126. The control and signaling data from RF hardware 122 is transmitted by physical layer interface 126 to base station controller 104, and the voice data from channel coding unit 124 is transmitted by physical layer interface 126 to voice transcoder and rate adaptation unit 130. Voice transcoder and rate adoption unit adapts the signal rate from the rate required by RF hardware 122 to the rate required by wireline domain of base station controller 108 and public switched telephone network 110. The signal is then transmitted to public switched telephone network 110 by base station controller 104 through mobile switching center 108.

GSM systems utilize what is commonly referred to as a "discontinuous transmission mode" or DTX mode, which is intended to increase system efficiency through a decrease of the interference level, by inhibiting the transmission of a radio signal when not required from an information point of view. As a result, this GSM DTX feature enables the transmission of voice data, in either the uplink or downlink direction, to occur only during periods of speech activity, and not during periods of silence. During such "silent" periods, the sender periodically sends a "silence descriptor" (SID) frame to the receiver, which updates the receiving station's idea of what constitutes the senders "background" or "comfort" noise. Assuming that the DTX has been enabled DTX and has populated broadcast control channel (BCCH) allocation list ("BA list") 123 located within call processor 121 of mobile station 106, with UMTS neighbor cells, the mobile station proceeds to maintain synchronization on the GSM neighbor cells as per the existing requirements. However, according to the present invention, logic is hierarchically applied to the current operational environment that utilizes periods of time which may become available for UMTS synchronization due to DTX, as described below.

For example, according to the present invention, during uplink DTX, i.e., when voice data is transmitted from mobile station 106 to base station 102, these periods of silence are detected by mobile station 106 using voice activity detector 118. For downlink DTX, i.e., when voice data is transmitted from base station 102 to mobile station 106, the present invention provides a mechanism, described below, whereby mobile station 106 obtains a priori knowledge of whether or not base station 106 is entering DTX on the downlink, i.e. when the downlink would not have to be monitored by the mobile station. As a result, the present invention provides procedures enabling UMTS synchronization to be performed by mobile station 106 when mobile station 106 is in GSM dedicated mode.

Figure 2:
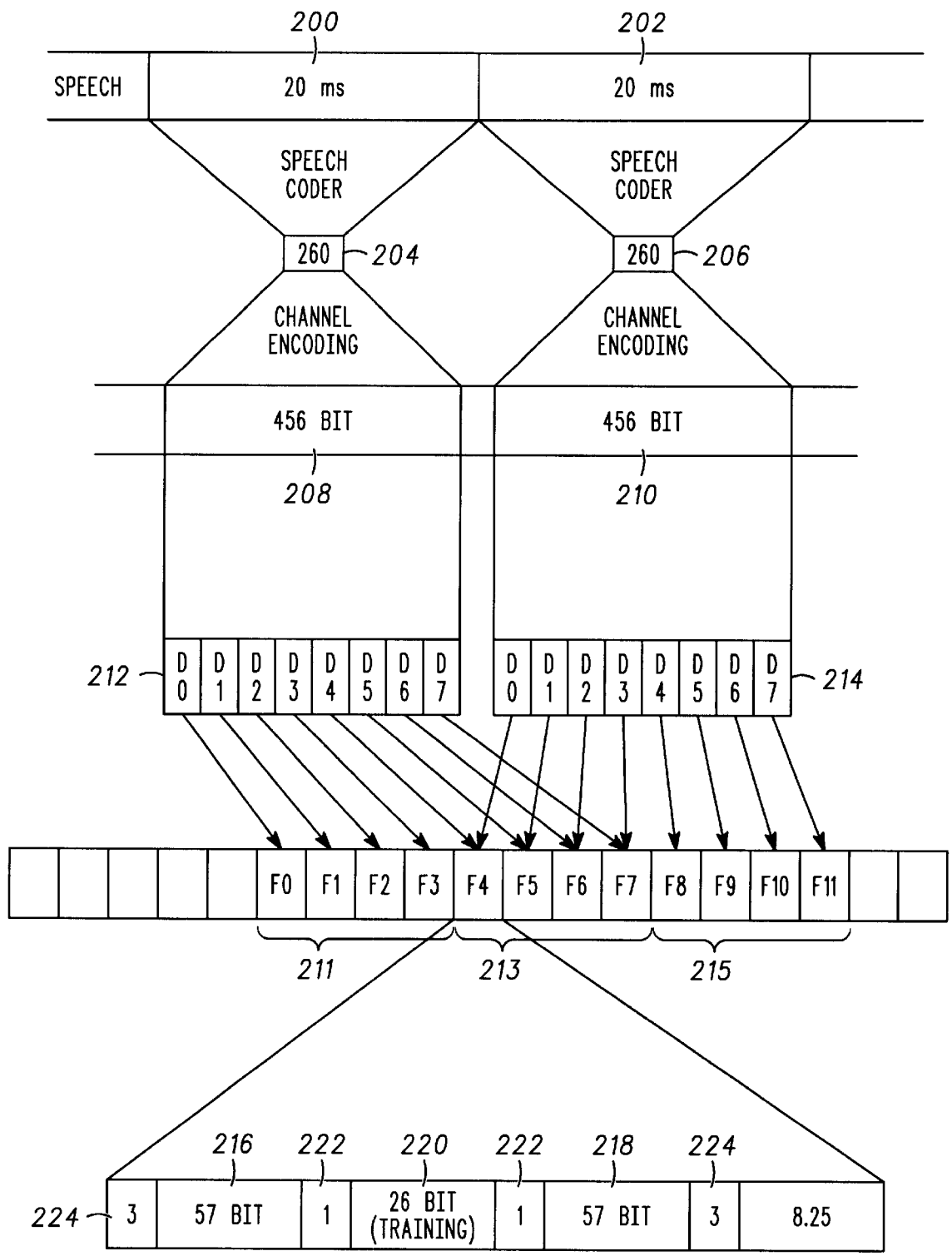
FIG. 2 is a schematic diagram of interleaving of a burst in a speech frame of a GSM transmission.

FIG. 2 is a schematic diagram of interleaving of a burst in a speech frame of a GSM transmission. As illustrated in FIGS. 1 and 2, using speech and channel coding unit 114, two consecutive 20 millisecond speech frames 200, 202 are formed into corresponding 260 bit code words 204, 206 using known speech coding schemes.

Using known channel encoding schemes, code words 204, 206 are then formed into two 456 bit code words 208, 210. Both 456 bit code words 208 and 210 are correspondingly divided into respective blocks 212 and 214, each containing eight pieces D0–D7, with each piece D0–D7 representing one eighth of the 456 bit quantity. Interleaving is then performed in speech and channel coding unit 114 using blocks 212 and 214 to form a stream of time division multiple access (TDMA) frames that includes frames F0–F11. The stream of TDMA frames is divided into three TDMA blocks, with the first TDMA block 211 including frames F0–F3, a second TDMA block 213 including frames F4–F7, and a third TDMA block 215 including frames F8–F11.

As illustrated in FIG. 2, the interleaving is performed using blocks 212 and 214 so that frames F0–F3 contain pieces D0–D3 of block 212, respectively. Frames F4 contains piece D4 of block 212 and piece DO of block 214, frame F5 contains piece D5 from block 212 and piece D1 from block 214, frame F6 contains piece D6 15 from block 212 and piece D2 from block 214, and frame F7 contains piece D7 from block 212 and piece D3 from block 214. Finally, frames F8–F11 contain pieces D4–D7, respectively, from block 214.

Each frame F0–F11 contains a first packet 216 of fifty-seven bits, and a second packet 218 of fifty-seven bits, corresponding to speech frames 200 and 202, respectively. The first packet 216 and second packet 218 surround a training sequence 220 of twenty-six bits, with a single bit 222 positioned between each of packets 216 and 218 and training sequence 220. Three tail bits 224 are added on each side. In this way, after having transformed speech into digital blocks 204, 206, channel coding adds redundancy. Resulting code words 208 and 210 are interleaved and spread into pieces D0–D7 of blocks 212 and 214, which are used to form the steam of TDMA frames F0–F11, with one burst being associated with each of frames F0–F11. The reverse transformation is then performed in the other direction.

It is understood that the present invention is not limited to the coding scheme and interleaving shown in FIG. 2, and may be utilized in any sequence of operations for transforming speech into digital blocks.

According to the present invention, because of the way the bursts are interleaved, if mobile station 106 detects two consecutive bursts on the downlink with no appreciable amount of received energy, then mobile station 106 may safely assume that there are two more time division multiple access (TDMA) frames following during which there is also no voice activity. Therefore, since each of the TDMA frames T0–T11 has a frame period that is equal to 4.61538 milliseconds, the present invention utilizes the resulting additional 9.2 ms for UMTS synchronization activities.

For example, according to the present invention, for each stream of TDMA frames, if mobile station 106 determines that there is no voice activity detected by voice activity detector 118, and that, based on the correlation information for the training sequence that is provided by equalizer 112, there is no cross correlated energy in frames F0 and F1, then periods occupied by frames F2 and F3 are assumed to usable for other activity by mobile station 106. Therefore, frames F2 and F3 are used for UMTS synchronization and the process continues using frame F4. In the same way, if mobile station 106 determines that there is no voice activity detected by voice activity detector 118 and there is no cross correlated energy in frames F4 and F5, then periods occupied by frames F6 and F7 are assumed to be usable for other activity by mobile station 106, and therefore, frames F6 and F7 are used for UMTS synchronization and the process continues using frame F8. Finally, if mobile station 106 determines that there is no voice activity detected by voice activity detector 118 and there is no cross correlated energy in frames F8 and F9, then periods occupied by frames F10 and F11 are assumed to usable for other activity by mobile station 106, and therefore, frames F10 and F11 are used for UMTS synchronization and the process continues using a next stream of TDMA frames, and so forth.

On the other hand, if voice activity is detected by voice activity detector, or if there is cross correlated energy detected in one of the TDMA frames, the process is repeated by mobile station 106 using the next TDMA frame, so that mobile station 106 determines both whether there is voice activity detected by voice activity detector 118, and whether there is cross correlated energy in the next frame, and so forth.

According to an alternative embodiment of the present invention, once either voice activity is detected by voice activity detector 118, or cross correlated energy is detected in one of TDMA frames F0–F11, the process may be continued using the next TDMA block, rather than the next TDMA frame. For example, if voice activity or cross correlated energy is detected in frame F0 of the first TDMA block 211, the process continues at the second TDMA block 213 using frame F4. If voice activity or cross correlated energy is then detected in frame F4, the process continues at third TDMA block 215, using frame F8, and if voice activity or cross correlated energy is then detected in frame F8, the process continues at a next stream of TDMA frames beginning at frame F0 of the first block 211 of the next stream.

As a result, according to the present invention, mobile station 106 performs UMTS synchronization during available idle frames corresponding to periods of voice inactivity on the downlink when base station 106 is utilizing DTX mode, and during periods of voice inactivity on the uplink when mobile station is utilizing DTX mode.

Figure 3:
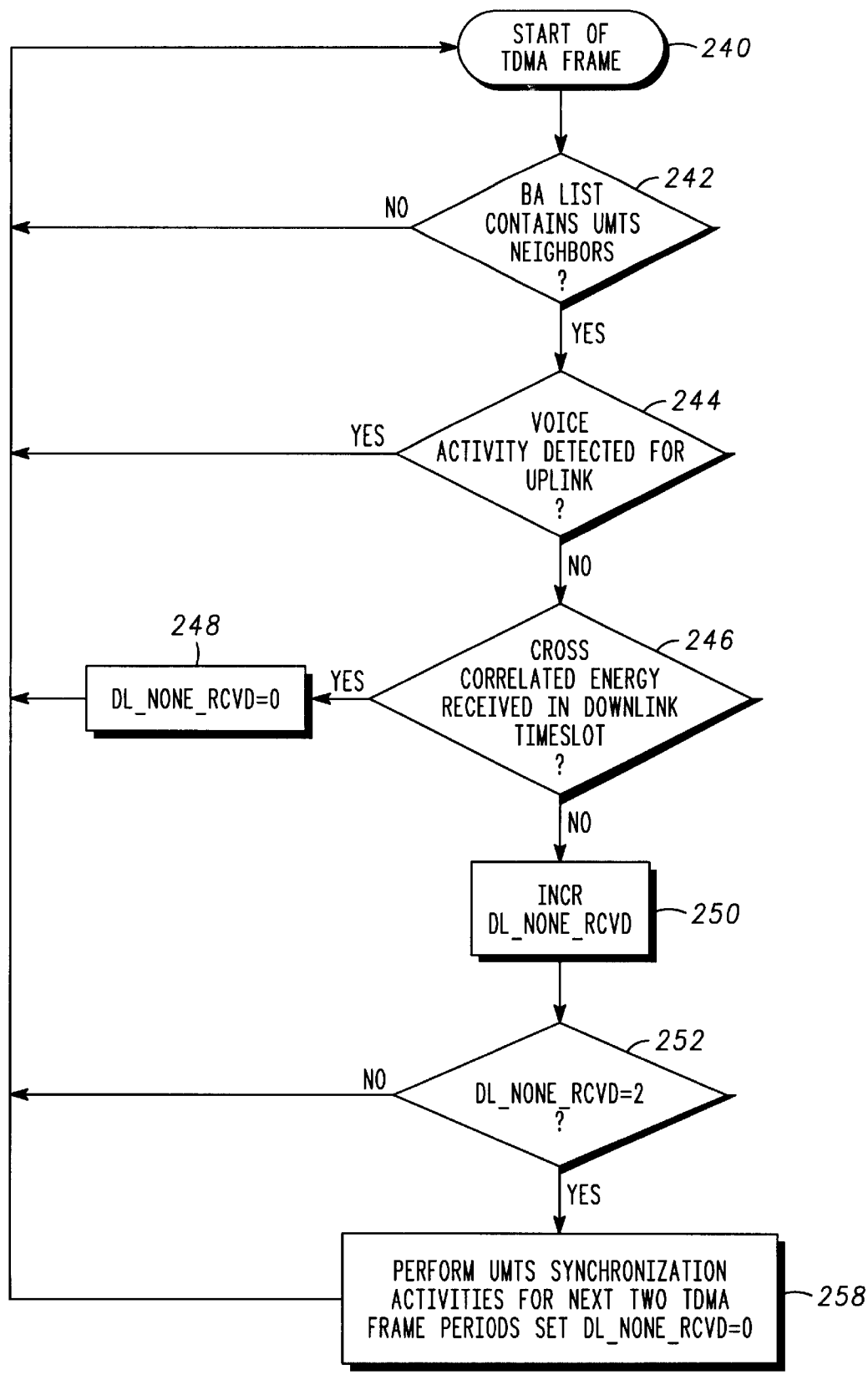
FIG. 3 is flowchart of synchronization of a mobile station to UMTS while operating in GSM dedicated mode, according to the present invention.

FIG. 3 is flowchart of synchronization of a mobile station to UMTS while operating in GSM dedicated mode, according to the present invention. As illustrated in FIGS. 1 and 3, the process is started at the beginning of a TDMA frame in Step 240, and a determination is made in Step 242 as to whether there are UMTS cells listed in a current BCCH allocation list 123 of mobile station 106. If there are not UMTS cells listed, it can be assumed that there is nothing available to synchronize with, and therefore the process returns to step 240. If it is determined in Step 242 that there are UMTS cells listed in current BCCH allocation list 123, a determination is then made in step 244 as to whether, for the uplink, voice activity is detected by voice activity detector 118. If voice activity is detected, the process continues at step 240 using the next TDMA frame.

If voice activity is not detected for the uplink in Step 244, a determination is then made in Step 246 as to whether energy is received in a downlink dedicated timeslot, and if the received energy cross correlates with a valid burst training sequence based on the correlation information from equalizer 112. The valid training sequence is a predetermined binary sequence having ergotic properties. If energy is received in a downlink dedicated timeslot and the received energy cross correlates with a valid burst training sequence, a downlink none received counter is set equal to zero, Step 248, and the process continues at Step 240 using the next TDMA frame. However, if energy is received in a downlink dedicated timeslot and the received energy does not cross correlate with a valid burst training sequence, the downlink none received counter is incremented, Step 250. As a result, Steps 246–250 of the present invention keep track of the number of TDMA frames in which no cross correlated energy has been received.

Once the downlink none received counter has been incremented in Step 250, a determination is then made in Step 252 as to whether two TDMA frames have gone by without the reception of cross correlated energy by determining whether the downlink none received counter is equal to two. If two TDMA frames having no cross correlated energy have not gone by, i.e., the downlink none received counter is not equal to two in Step 252, the process continues at Step 240 using the next frame. However, if two TDMA frames having no cross correlated energy have gone by, i.e., the downlink none received counter is determined to be equal to two in Step 252, mobile station 106 utilizes the next two TDMA frame periods for synchronization activities on UMTS, and sets the downlink none received counter equal to zero in Step 258, and the process continues at Step 240 using the next TDMA frame subsequent to the two utilized frames.

As described above, according to the alternate embodiment of the present invention, once either voice activity is detected by voice activity detector 118 in Step 244, or cross correlated energy is detected in one of the TDMA frames F0–F11 in Step 246, the process may be continued using the next TDMA block, rather than the next TDMA frame. For example, if voice activity or cross correlated energy is detected in frame F0 or frame F1 of first TDMA block 211 in Steps 244 and 246, the process continues in Step 240 at frame F4 of second TDMA block 213. If voice activity or cross correlated energy is then detected in frame F4 or frame F5, the process continues at third TDMA block 215, using frame F8, and if voice activity or cross correlated energy is then detected in frame F8 or frame F9, the process continues at a next stream of TDMA frames beginning at frame F0 of the first TDMA block 211 of the next stream of TDMA frames.

As a result, the present invention comprises a method whereby a mobile station may take advantage of the periods in which there are instantaneously no data in either downlink or uplink direction due to DTX.

While a particular embodiment of the present invention has been shown and described, modifications may be made. It is therefore intended in the appended claims to cover all such changes and modifications which fall within the true spirit and scope of the invention.

What is claimed is:

1. A mobile station transmitting and receiving data in a first transmission mode, the mobile station comprising:
    a voice activity detector detecting voice activity and transmitting control information in response to the detected voice activity;
    an equalizer identifying and processing a training sequence and transmitting corresponding correlation information; and
    a physical layer interface detecting a discontinuous transmission based on the control information and the correlation information, wherein synchronization of the mobile station in a second transmission mode is performed in response to the detected discontinuous transmission,
    wherein the first mode is a Global System for Mobile communication (GSM) mode and the second mode is a Universal mobile telephone service (UMTS) mode.

2. The mobile station of claim 1, wherein the data is received by the mobile station in a plurality of frames, the physical layer interface determining whether there is cross correlated energy in first consecutive frames of the plurality of frames based on the correlation information, and wherein second consecutive frames subsequent to the first consecutive frames are utilized for synchronization in response to no cross correlated energy in the first consecutive frames and no voice activity during receipt of the first consecutive frames.

3. The mobile station of claim 2, wherein, in response to one of cross correlated energy being detected in the first consecutive frames and voice activity being detected during receipt of the first consecutive frames, the physical layer interface determines whether there is cross correlated energy in the second consecutive frames based on the correlation information, and wherein third consecutive frames subsequent to the second consecutive frames are utilized for synchronization in response to no cross correlated energy in the second consecutive frames and no voice activity during receipt of the second consecutive frames.

4. The mobile station of claim 2, wherein the plurality of frames are divided into a plurality of blocks, with a first block of the plurality blocks including the first and the second consecutive frames, and wherein, in response to one of cross correlated energy detected in the first consecutive frames and voice activity detected during receipt of the first consecutive frames, the physical layer interface determines whether there is cross correlated energy in first consecutives frames of a next block subsequent to the first block and consecutive frames subsequent to the first consecutive frames of the next block are utilized for synchronization in response to no cross correlated energy in the first consecutive frames of the next block and no voice activity during receipt of the first consecutive frames of the next block.

5. The mobile station of claim 1, wherein the data is received by the mobile station in a plurality of frames, the physical layer interface determining whether there is cross correlated energy in a first frame and in a second frame of the plurality of frames, the second frame subsequent to the first frame, and wherein a third frame and a fourth frame of the plurality of frames, subsequent to the first and the second frame, are utilized for synchronization in response to no cross correlation energy in the first and the second frame and no voice activity during receipt of the first and the second frame.

6. The mobile station of claim 5, wherein, in response to one of cross correlated energy being detected in the first frame and voice activity being detected during receipt of the first frame, the physical layer interface determines whether there is cross correlated energy in the second frame and the third frame, and, in response to no cross correlated energy in the second and the third frame and no voice activity during receipt of the second and the third frame, the fourth frame and a fifth frame subsequent to the fourth frame are utilized for synchronization.

7. The mobile station of claim 6, wherein, in response to no cross correlated energy being detected in the first frame and no voice activity being detected during receipt of the first frame, and one of cross correlated energy being detected in the second frame and voice activity being detected during receipt of the second frame, the physical layer interface determines whether there is cross correlated energy in the third frame and the fourth frame, and, in response to no cross correlated energy in the third and the fourth frame and no voice activity during receipt of the third and the fourth frame, the fifth frame and the sixth frame are utilized for synchronization.

8. The mobile station of claim 5, wherein the plurality of frames are divided into a plurality of blocks, with a first block of the plurality blocks including the first and the second frame, and, in response to determining there is cross correlated energy in one of the first and the second frame, the physical layer interface determines whether there is cross correlated energy in a first frame and a second frame of a next block subsequent to the first block, and wherein a third frame and a fourth frame subsequent to the first and second frame of the next block are utilized for synchronization in response to no cross correlated energy in the first and the second frame of the next block and no voice activity during receipt of the first and the second frame of the next block.

9. A method for synchronization in a first transmission mode by a mobile station transmitting and receiving data in a second transmission mode, comprising the steps of:

detecting voice activity in an uplink transmission;

detecting cross correlated energy received in a downlink transmission;

detecting discontinuous transmission in response to the detecting of voice activity and the detecting of cross correlated energy; and performing synchronization in the first transmission mode in response to the detected discontinuous transmission mode, wherein the first mode is a Global System for Mobile Communication (GSM) mode and the second mode is a Universal mobile telephone service (UMTS) mode.

10. The method of claim 9, wherein the step of detecting discontinuous transmission comprises the step of determining whether there is cross correlated energy in first consecutive frames and utilizing second consecutive frames subsequent to the first consecutive frames for synchronization in response to no cross correlated energy in the first consecutive frames and no voice activity being detected during receipt of the first consecutive frames.

11. The method of claim 10, wherein the step of performing synchronization further comprises determining, in response to one of cross correlated energy being detected in the first consecutive frames and voice activity being detected during receipt of the first consecutive frames, whether there is cross correlated energy in the second consecutive frames and utilizing third consecutive frames subsequent to the second consecutive frames for synchronization in response to no cross correlated energy in the second consecutive frames and no voice activity being detected during receipt of the second consecutive frames.

12. The method of claim 10, wherein the first consecutive frames are positioned within a first block of the data and the step of performing synchronization further comprises determining, in response to one of cross correlated energy being detected in the first consecutive frames and voice activity being detected during receipt of the first consecutive frames, whether there is cross correlated energy in first consecutive frames of a second block subsequent to the first block and utilizing second consecutive frames subsequent to the first consecutive frames of the second block for synchronization in response to no cross correlated energy in the first consecutive frames of the second block and no voice activity being detected during receipt of the first consecutive frames of the second block.

13. The method of claim 9, wherein the step of detecting discontinuous transmission comprises the step of determining whether there is cross correlated energy in a first frame and in a second frame subsequent to the first frame, and utilizing a third frame and a fourth frame subsequent to the first and the second frame for synchronization in response to no cross correlation energy in the first and the second frame and no voice activity during receipt of the first and the second frame.

14. The method of claim 13, wherein, in response to one of cross correlated energy being detected in the first frame and voice activity being detected during receipt of the first frame, the step of detecting discontinuous transmission further comprises the step of determining whether there is cross correlated energy in the second frame and the third frame, and utilizing the fourth frame and a fifth frame subsequent to the fourth frame for synchronization in response to no cross correlated energy in the second and the third frame and no voice activity during receipt of the second and the third frame.

15. The method of claim 14, wherein, in response to no cross correlated energy being detected in the first frame and no voice activity being detected during receipt of the first frame, and one of cross correlated energy being detected in the second frame and voice activity being detected during receipt of the second frame, the step of detecting discontinuous transmission further comprises the step of determining whether there is cross correlated energy in the third frame and the fourth frame, and utilizing the fifth frame and the sixth frame for synchronization in response to no cross correlated energy in the third and the fourth frame and no voice activity during receipt of the third and the fourth frame.

16. The method of claim 15, wherein the first and the second frame is positioned within a first block of the data and, in response to determining there is cross correlated energy in one of the first and the second frame, the step of performing synchronization further comprises determining whether there is cross correlated energy in a first frame and a second frame of a next block subsequent to the first block, and utilizing a third frame and a fourth frame subsequent to the first and second frame of the next block for synchronization in response to no cross correlated energy in the first and the second frame of the next block and no voice activity during receipt of the first and the second frame of the next block.

17. A wireless communication system including a mobile station sending data to and receiving data from a base station in a first transmission mode, comprising:

a voice activity detector, positioned within the mobile station, transmitting control information indicating detection of voice activity being transmitted from the mobile station to the base station;

a first physical layer interface, positioned in the base station, transmitting signaling and voice data to the mobile station;

an equalizer, positioned in the mobile station, identifying and processing a training sequence and transmitting corresponding information for the training sequence; and a second physical layer interface, positioned in the mobile station, determining whether the mobile station is utilizing discontinuous transmission mode based on the control information from the voice activity detector, and determining whether the base station is utilizing discontinuous transmission mode based on the correlation information from the equalizer, wherein synchronization of the mobile station in a second transmission mode is performed in response to the mobile station and the base station utilizing discontinuous transmission mode, and wherein the first mode is a Global System for Mobile Communication (GSM) mode and the second mode is a Universal mobile telephone service (UMTS) mode.

18. The wireless communication system of claim 17, wherein the data is received by the mobile station in a plurality of frames, the second physical layer interface determining whether there is cross correlated energy in first consecutive frames of the plurality of frames based on the correlation information, and wherein second consecutive frames subsequent to the first consecutive frames are utilized for synchronization in the second mode in response to no cross correlated energy in the first consecutive frames and no voice activity during receipt of the first consecutive frames.

19. The wireless communication system of claim 18, wherein, in response to one of cross correlated energy being detected in the first consecutive frames and voice activity being detected during receipt of the first consecutive frames, the second physical layer interface determines whether there is cross correlated energy in the second consecutive frames based on the correlation information, and wherein third consecutive frames subsequent to the second consecutive frames are utilized for synchronization in the second mode in response to no cross correlated energy in the second consecutive frames and no voice activity during receipt of the second consecutive frames.

20. The mobile station of claim 18, wherein the plurality of frames are divided into a plurality of blocks, with a first block of the plurality blocks including the first and the second consecutive frames, and wherein, in response to one of cross correlated energy detected in the first consecutive frames and voice activity detected during receipt of the first consecutive frames, the second physical layer interface determines whether there is cross correlated energy in first consecutives frames of a next block subsequent to the first block and consecutive frames subsequent to the first consecutive frames of the next block are utilized for synchronization in the second mode in response to no cross correlated energy in the first consecutive frames of the next block and no voice activity during receipt of the first consecutive frames of the next block.

21. The wireless communication system of claim 17, wherein the data is received by the mobile station in a plurality of frames, the second physical layer interface determining whether there is cross correlated energy in a first frame and in a second frame of the plurality of frames, the second frame subsequent to the first frame, and wherein a third frame and a fourth frame of the plurality of frames, subsequent to the first and the second frame, are utilized for synchronization in the second mode in response to no cross correlation energy in the first and the second frame and no voice activity during receipt of the first and the second frame.

22. The wireless communication system of claim 21, wherein, in response to one of cross correlated energy being detected in the first frame and voice activity being detected during receipt of the first frame, the second physical layer interface determines whether there is cross correlated energy in the second frame and the third frame, and, in response to no cross correlated energy in the second and the third frame and no voice activity during receipt of the second and the third frame, the fourth frame and a fifth frame subsequent to the fourth frame are utilized for synchronization in the second mode.

23. The wireless communication system of claim 22, wherein, in response to no cross correlated energy being detected in the first frame and no voice activity being detected during receipt of the first frame, and one of cross correlated energy being detected in the second frame and voice activity being detected during receipt of the second frame, the second physical layer interface determines whether there is cross correlated energy in the third frame and the fourth frame, and, in response to no cross correlated energy in the third and the fourth frame and no voice activity during receipt of the third and the fourth frame, the fifth frame and the sixth frame are utilized for synchronization in the second mode.

24. The wireless communication system of claim 21, wherein the plurality of frames are divided into a plurality of blocks, with a first block of the plurality blocks including the first and the second frame, and, in response to determining there is cross correlated energy in one of the first and the second frame, the second physical layer interface determines whether there is cross correlated energy in a first frame and a second frame of a next block subsequent to the first block, and wherein a third frame and a fourth frame subsequent to the first and second frame of the next block are utilized for synchronization in the second mode in response to no cross correlated energy in the first and the second frame of the next block and no voice activity during receipt of the first and the second frame of the next block.

\* \* \* \* \*